(12) United States Patent
Liu et al.

(10) Patent No.: US 10,763,732 B2
(45) Date of Patent: Sep. 1, 2020

(54) LINEAR VIBRATION MOTOR

(71) Applicant: Goertek Inc., Weifang, Shandong (CN)

(72) Inventors: Chunfa Liu, Weifang (CN); Fenglei Zu, Weifang (CN)

(73) Assignee: Goertek Inc., Weifang, Shandong (CN)

( * ) Notice: Subject to any disclaimer, the term of this patent is extended or adjusted under 35 U.S.C. 154(b) by 201 days.

(21) Appl. No.: 15/778,816

(22) PCT Filed: May 20, 2016

(86) PCT No.: PCT/CN2016/082842
§ 371 (c)(1),
(2) Date: May 24, 2018

(87) PCT Pub. No.: WO2017/088385
PCT Pub. Date: Jun. 1, 2017

(65) Prior Publication Data
US 2018/0358879 A1    Dec. 13, 2018

(30) Foreign Application Priority Data
Nov. 25, 2015  (CN) .......................... 2015 1 0835599

(51) Int. Cl.
*H02K 33/02*      (2006.01)
*H02K 1/34*       (2006.01)
(Continued)

(52) U.S. Cl.
CPC .............. *H02K 33/02* (2013.01); *H02K 1/34* (2013.01); *H02K 33/18* (2013.01); *F16F 2224/02* (2013.01); *H02K 5/04* (2013.01)

(58) Field of Classification Search
CPC ........ H02K 33/02; H02K 33/14; H02K 33/18; H02K 1/34; H02K 5/04; F16F 2224/02
(Continued)

(56) References Cited

U.S. PATENT DOCUMENTS 8,456,042 B2 * 6/2013 Dong .................... H02K 33/16
                                                  310/15
9,048,718 B2 * 6/2015 Zhang ................... H02K 33/02
(Continued)

FOREIGN PATENT DOCUMENTS

CN        201750320 U    2/2011
CN        201750321 U    2/2011
(Continued)

OTHER PUBLICATIONS

International Searching Authority, International Search Report and Written Opinion for International Application No. PCT/CN2016/082842, dated Sep. 1, 2016, 12 pages, State Intellectual Property Office of the P.R.C., China.

*Primary Examiner* — John K Kim
(74) *Attorney, Agent, or Firm* — Alston & Bird LLP

(57) ABSTRACT

A linear vibration motor comprises: a motor housing, a stator, a vibrator, and at least two sets of elastic support assemblies for suspending the vibrator in the motor housing and for supporting the vibrator and providing an elastic restoring force. The elastic support assemblies are located between the inner wall of the motor housing and the vibrator, each set of the elastic support assemblies comprising at least two elastic supports. The elastic support comprises a first connection point fixedly connected to the vibrator and a second connection point fixedly connected to the inner wall of the motor housing. The second connection point is coupled to a side wall of the motor housing parallel to the vibration direction of the vibrator. The first connection point and the second connection point of the elastic support are located at the same side of the central axis of the vibrator parallel to the vibration direction of the transducer. The structure of the linear vibration motor is simplified, the (Continued)

vibration support assemblies have better vibration effect, and give the user a good experience.

11 Claims, 3 Drawing Sheets

(51) Int. Cl.
  *H02K 33/18* (2006.01)
  *H02K 5/04* (2006.01)
(58) Field of Classification Search
  USPC .................................. 310/15, 17, 25, 28, 29
  See application file for complete search history.

(56) References Cited

U.S. PATENT DOCUMENTS

| | | | | |
|---|---|---|---|---|
| 10,236,761 | B2* | 3/2019 | Wang | H02K 33/16 |
| 2011/0115311 | A1* | 5/2011 | Dong | H02K 33/16 |
| | | | | 310/28 |
| 2011/0156500 | A1* | 6/2011 | Dong | H02K 33/16 |
| | | | | 310/25 |
| 2012/0169148 | A1* | 7/2012 | Kim | H02K 33/16 |
| | | | | 310/25 |
| 2012/0169151 | A1* | 7/2012 | Dong | H02K 33/16 |
| | | | | 310/25 |
| 2012/0187780 | A1* | 7/2012 | Bang | H02K 33/16 |
| | | | | 310/25 |
| 2012/0227269 | A1* | 9/2012 | Subramanian | B26B 19/282 |
| | | | | 30/210 |
| 2016/0181900 | A1* | 6/2016 | Xu | H02K 33/16 |
| | | | | 310/12.27 |
| 2017/0117788 | A1* | 4/2017 | Hou | H02K 5/04 |
| 2017/0126088 | A1* | 5/2017 | Mao | H02K 33/16 |
| 2018/0342937 | A1* | 11/2018 | Mao | H02K 33/02 |
| 2018/0351442 | A1* | 12/2018 | Liu | H02K 33/14 |
| 2020/0044546 | A1* | 2/2020 | Zhang | H02K 33/16 |

FOREIGN PATENT DOCUMENTS

| | | |
|---|---|---|
| CN | 202121478 U | 1/2012 |
| CN | 202652032 U | 1/2013 |
| CN | 105406676 A | 3/2016 |
| CN | 205123540 U | 3/2016 |
| CN | 205178818 U | 4/2016 |

* cited by examiner

LINEAR VIBRATION MOTOR

CROSS-REFERENCE TO RELATED APPLICATIONS

This application is a National Stage of International Application No. PCT/CN2016/082842, filed on May 20, 2016, which claims priority to Chinese Patent Application No. 201510835599.5, filed on Nov. 25, 2015, both of which are hereby incorporated by reference in their entireties.

BACKGROUND

Technical Field

The present invention belongs to the technical field of electronic products and particularly relates to a linear vibration motor.

Related Art

With rapid development of portable consumer electronic products, consumers increasingly prefer electronic products which are lighter and thinner and can provide better tactile experience such as a handheld multimedia entertainment device, a handheld game machine and a mobile phone. A linear vibration motor is generally used as an execution mechanism of tactile experience and achieves the effect of system vibration feedback. The development of the electronic products towards lightness and thinness determines that a vibration component must be improved towards the direction of flatness in dimensions.

Currently, the linear vibration motor used in the electronic product generally comprises a magnetic vibrator and a spring element which are accommodated in a housing. The spring element is used for suspending the magnetic vibrator in the housing, providing restoring forces and providing positioning orientation for the magnetic vibrator. The spring element is mostly made of a metal sheet and is connected between the vibrator and the housing via a connecting shaft which is used for providing supporting forces for the vibrator. However, for the arrangement of the connecting shaft, it needs to arrange structural members such as a bearing and a sliding channel on the vibrator correspondingly so as to achieve horizontal restoring of the spring element. As a result, the structures of the vibrator and the whole linear vibration motor are complicated, blocking diversified design of the spring element.

BRIEF SUMMARY

An object of the present invention is provide a linear vibration motor which has a simple structure and can effectively provide supporting forces and restoring forces for a vibrator.

The present invention is achieved as follows. A linear vibration motor comprises a motor housing, a stator, a vibrator and at least two sets of elastic support assemblies which suspend the vibrator in the motor housing and are used for supporting the vibrator and providing elastic restoring forces. The elastic support assemblies are located between an inner wall of the motor housing and the vibrator. Each set of the elastic support assemblies comprises at least two elastic supports.

The elastic support comprises a first connection point fixedly connected to the vibrator and a second connection point fixedly connected to the inner wall of the motor housing, and the second connection point is coupled onto a side wall, parallel to a vibration direction of the vibrator, of the motor housing.

Both the first connection point and the second connection point of the elastic support are located on the same side of a central axis of the vibrator, and the central axis of the vibrator is parallel to the vibration direction of the vibrator.

As an improved solution, the elastic support comprises a first elastic arm formed by extending the first connection point and a second elastic arm formed by extending the second connection point, and tail ends of the first elastic arm and the second elastic arm are connected.

As an improved solution, the first elastic arm and the second elastic arm are located on the same side of the first connection point and the second connection point.

The first elastic arm is formed by extending the first connection point to a side, away from the first connection point, of the vibrator, and the second elastic arm is formed by extending the second connection point along the side wall, parallel to the vibration direction of the vibrator, of the motor housing, and the side, away from the first connection point, of the vibrator successively.

As an improved solution, the tail ends of the first elastic arm and the second elastic arm are fixed by welding.

As an improved solution, a third elastic arm which turns and extends towards the first connection point is arranged at an end, away from the first connection point, of the first elastic arm.

A fourth elastic arm which turns and extends towards the second connection point is arranged at an end, away from the second connection point, of the second elastic arm.

Extending tail ends of the third elastic arm and the fourth elastic arm are connected.

As an improved solution, a make-way portion is arranged at an intersection position of the two elastic supports.

As an improved solution, the elastic supports are elastic sheets or springs.

As an improved solution, the material width of the elastic sheet is greater than the thickness of the elastic sheet.

As an improved solution, the elastic sheet comprises two metal material layers located on a surface and a damping material layer coupled between the two metal material layers.

As an improved solution, a damping element is arranged between the elastic support assembly and the vibrator, between the elastic support assembly and the inner wall of the motor housing and/or inside an elastic gap in the elastic support assembly, respectively.

As an improved solution, the vibrator comprises at least two adjacent permanent magnets and a magnetic conduction yoke arranged between the adjacent permanent magnets; and adjacent ends of the two adjacent permanent magnets have the same polarity.

The stator comprises coils and magnetic conduction cores arranged in the coils.

A magnetization direction of the permanent magnet is perpendicular to an axis of the coil.

As an improved solution, the magnetic conduction yoke and the magnetic conduction core are staggered.

A horizontal distance d between the magnetic conduction yoke and the magnetic conduction core corresponding to the magnetic conduction yoke is within a numerical range of [0.1 mm, 0.3 mm].

The linear vibration motor comprises the motor housing, the stator, the vibrator and at least two sets of the elastic support assemblies which suspend the vibrator in the motor housing and are used for supporting the vibrator and providing elastic restoring forces; the elastic support assemblies are located between the inner wall of the motor housing and the vibrator; each set of the elastic support assemblies comprises at least two elastic supports; the elastic support comprises the first connection point fixedly connected to the vibrator and the second connection point fixedly connected to the inner wall of the motor housing, and the second connection point is coupled onto the side wall, parallel to the vibration direction of the vibrator, of the motor housing; and both the first connection point and the second connection point of the elastic support are located on the same side of the central axis of the vibrator, and the central axis of the vibrator is parallel to the vibration direction of the vibrator. Therefore, the structure of the whole linear vibration motor is simplified and the vibration effect of the elastic support assemblies is good, thereby bringing good experience to users.

In the figures, the reference signs represent the following components: 1—motor housing; 2—vibrator; 3—elastic support assembly; 4—elastic support; 5—first connection point; 6—second connection point; 7—upper cover; 8—lower bottom plate; 9—mass block; 10—permanent magnet; 11—first elastic arm; 12—second elastic arm; 13—make-way portion; 14—metal material layer; 15—damping material layer; 16—coil; 17—magnetic conduction yoke; 18—magnetic conduction core; 19—damping element.

DETAILED DESCRIPTION OF THE VARIOUS EMBODIMENTS

In order to make the purposes, technical solutions and advantages of the present invention clearer, the present invention is further illustrated in detail below with reference to the accompanying drawings and embodiments. It should be understood that the specific embodiments described herein are only intended to explain the present invention instead of limiting the present invention.

Figure 1:
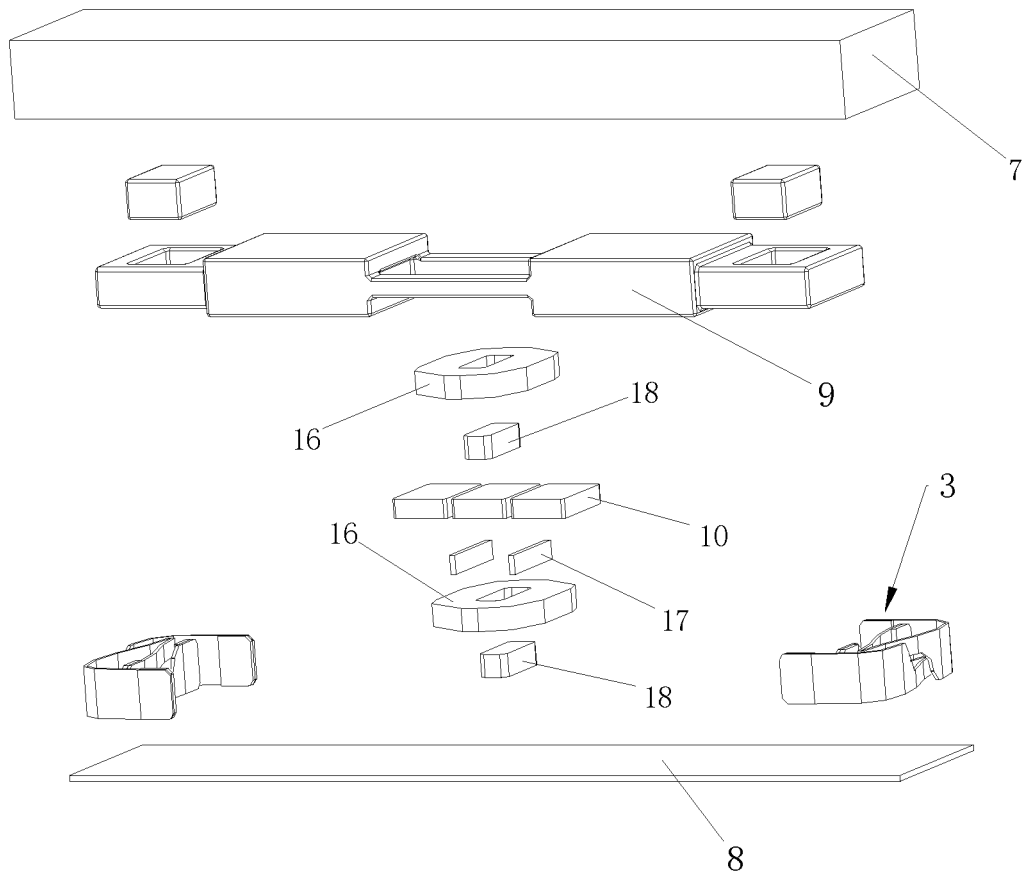
FIG. 1 is an exploded schematic structural view of the linear vibration motor provided by the present invention.

FIG. 1 shows an exploded schematic structural view of the linear vibration motor provided by the present invention. For ease of description, only a part related to the present invention is shown.

Figure 2:
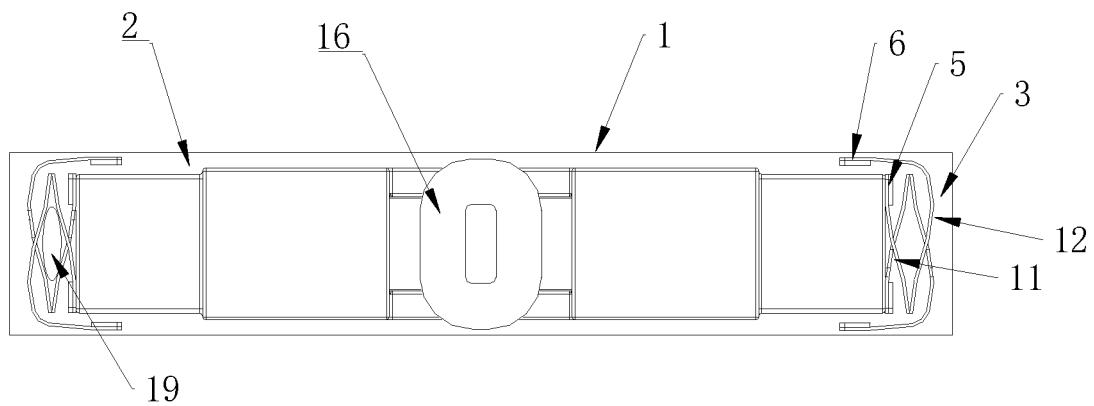
FIGS. 2 and 5 are structural assembly views of the linear vibration motor provided by the present invention, respectively.
Figure 3:
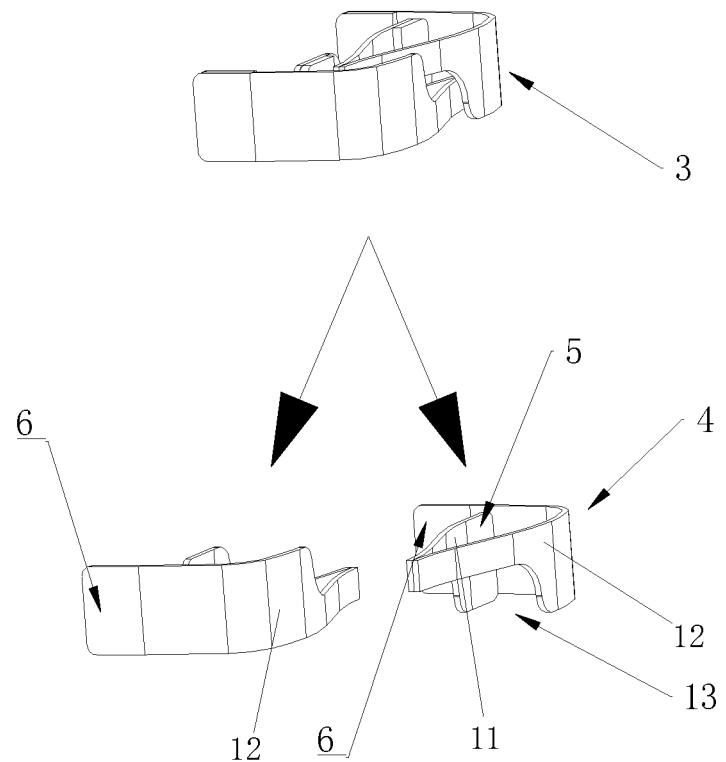
FIG. 3 is a schematic structural view of the elastic support assembly provided by the present invention.
Figure 5:
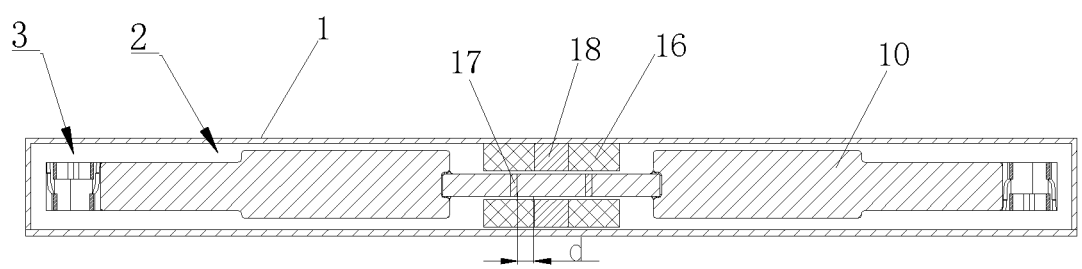

With reference to FIGS. 2, 3 and 5, a linear vibration motor comprises a motor housing 1, a stator, a vibrator 2 and at least two sets of elastic support assemblies 3 which suspend the vibrator 2 in the motor housing 1 and are used for supporting the vibrator 2 and providing elastic restoring forces. The elastic support assemblies 3 are located between an inner wall of the motor housing 1 and the vibrator 2. Each set of the elastic support assemblies 3 comprises at least two elastic supports 4.

The elastic support 4 comprises a first connection point 5 fixedly connected to the vibrator 2 and a second connection point 6 fixedly connected to the inner wall of the motor housing 1, and the second connection point 6 is coupled onto a side wall, parallel to a vibration direction of the vibrator 2, of the motor housing 1.

Both the first connection point 5 and the second connection point 6 of the elastic support 4 are located on the same side of a central axis of the vibrator 2, and the central axis of the vibrator 2 is parallel to the vibration direction of the vibrator 2.

In the present invention, the motor housing 1 comprises an upper cover 7 and a lower bottom plate 8 which are coupled together. The upper cover 7 is of a box-shaped structure with one open end. The lower bottom plate 8 is of a plate-like structure. The open end of the upper cover 7 is buckled on the lower bottom plate 8. The stator is fixed on the upper cover 7 and the lower bottom plate 8. The vibrator 2 is suspended, through the elastic support assemblies 3, in a space defined by the upper cover 7 and the lower bottom plate 8.

In the present invention, the vibrator 2 acts as a driving structure of the whole vibration motor and may be arranged as follows.

In addition to a mass block 9, the vibrator 2 further comprises at least two adjacent permanent magnets 10 and a magnetic conduction yoke 17 arranged between the adjacent permanent magnets 10. Adjacent ends of the two adjacent permanent magnets 10 have the same polarity.

The stator comprises coils 16 and magnetic conduction cores 18 arranged in the coils 16.

Moreover, a magnetization direction of the permanent magnet 10 is perpendicular to an axis of the coil 16.

The magnetic conduction yoke 17 and the magnetic conduction core 18 are staggered.

A horizontal distance d between the magnetic conduction yoke 17 and the magnetic conduction core 18 corresponding to the magnetic conduction yoke 17 is within a numerical range of [0.1 mm, 0.3 mm]. The distance d is as shown in FIG. 5.

Of course, the linear vibration motor further comprises other components and the detailed description thereof is omitted herein.

When the linear vibration motor works, an alternating current is introduced to the coils 16, and under the interaction of the permanent magnets 10, the coils 16 and the magnetic conduction cores 18, the vibrator 2 performs reciprocating vibration along a horizontal direction to generate a vibration.

As shown in FIG. 3, the elastic support 4 comprises a first elastic arm 11 formed by extending the first connection point 5 and a second elastic arm 12 formed by extending the second connection point 6. Tail ends of the first elastic arm 11 and the second elastic arm 12 are connected. The first elastic arm 11 and the second elastic arm 12 may be connected by welding.

In the present invention, the first elastic arm 11 and the second elastic arm 12 are located on the same side of the first connection point 5 and the second connection point 6. The same side means that extending directions of the first elastic arm 11 and the second elastic arm 12 are basically the same.

The first elastic arm 11 is formed by extending the first connection point 5 to the side, away from the first connection point 5, of the vibrator 2. The second elastic arm 12 is formed by extending the second connection point 6 along the side wall, parallel to the vibration direction of the vibrator 2, of the motor housing 1, and the side, away from the first connection point 5, of the vibrator 2 successively. It can be seen from FIG. 3 that each of the first elastic arm 11 and the second elastic arm 12 of the elastic support assembly 4 is of a V+C structure.

In the present invention, on the basis of the effect shown in FIG. 3, the structure of the elastic support assembly 4 may be extended as follows.

A third elastic arm (not shown in the figure) which turns and extends towards the first connection point 5 is arranged at an end, away from the first connection point 5, of the first elastic arm 11.

A fourth elastic arm (not shown in the figure) which turns and extends towards the second connection point 6 is arranged at an end, away from the second connection point 6, of the second elastic arm 12.

Extending tail ends of the third elastic arm and the fourth elastic arm are connected.

That is, the elastic arm between the first connection point 5 and the second connection point 6 of the elastic support 4 may adopt a folding and extending structure, i.e., a structure having four extending elastic arms. This is not intended to limit the present invention.

In the present invention, as shown in FIGS. 2 and 3, a make-way portion 13 is arranged at an intersection position of the two elastic supports 4. The make-way portion may be implemented by adopting various modes, such as a mode of arranging a bend or a make-way groove. The detailed description thereof is omitted herein.

In the present invention, the elastic supports 4 in the above embodiments are elastic sheets or springs.

When the elastic supports 4 are the elastic sheets, the material width of the elastic sheet is greater than the thickness of the elastic sheet, that is, the vertical height of the elastic sheet shown in FIG. 3 is greater than the material thickness of the elastic sheet, so as to increase the supporting strength of the elastic supports 4 for the vibrator 2.

Figure 4:
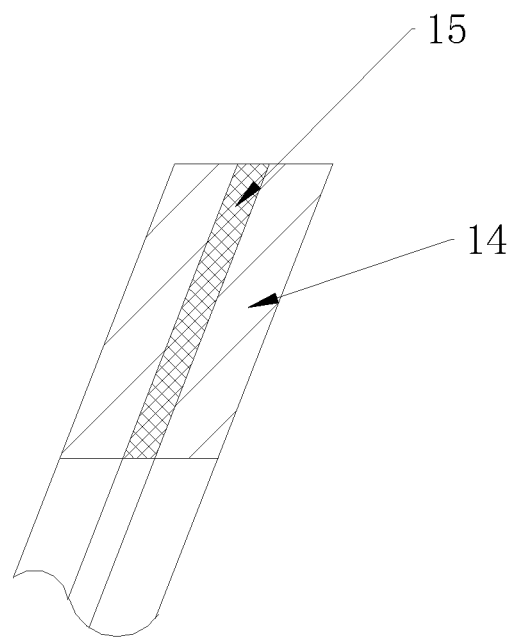
FIG. 4 is a layered schematic structural view of the elastic sheet provided by the present invention.

As shown in FIG. 4, the elastic sheet comprises two metal material layers 14 located on a surface and a damping material layer 15 coupled between the two metal material layers 14. The two metal material layers 14 and the damping material layer 15 are integrally coupled by a glue bonding or hot-pressing process.

In the present invention, as shown in FIG. 2, a damping element 19 is arranged between the elastic support assembly 3 and the vibrator 2, between the elastic support assembly 3 and the inner wall of the motor housing 1 and/or inside an elastic gap in the elastic support assembly 3, respectively. The damping element 19 mainly achieves the effect of buffering. The structure and shape of the damping element may be set according to the structures of the elastic support assembly 3, the inner wall of the motor housing 1 and the vibrator 2. The detailed description thereof is omitted herein.

In the present invention, the linear vibration motor comprises the motor housing 1, the stator, the vibrator 2 and at least two sets of elastic support assemblies 3 which suspend the vibrator 2 in the motor housing 1 and are used for supporting the vibrator 2 and providing elastic restoring forces. The elastic support assemblies 3 are located between the inner wall of the motor housing 1 and the vibrator 2. Each set of the elastic support assemblies 3 comprises at least two elastic supports 4. The elastic support 4 comprises the first connection point 5 fixedly connected to the vibrator 2 and the second connection point 6 fixedly connected to the inner wall of the motor housing 1, and the second connection point 6 is coupled onto the side wall, parallel to the vibration direction of the vibrator 2, of the motor housing 1. Both the first connection point 5 and the second connection point 6 of the elastic support 4 are located on the same side of the central axis of the vibrator 2. The central axis of the vibrator 2 is parallel to the vibration direction of the vibrator 2. Therefore, the structure of the whole linear vibration motor is simplified and the vibration effect of the elastic support assemblies 3 is good, thereby bringing good experience to users.

The above description is only preferred embodiments of the present invention, and is not intended to limit the present invention. Any modifications, equivalent replacements, improvements and the like made within the spirit and principles of the present invention should be comprised within the scope of protection of the present invention.

What is claimed is:

1. A linear vibration motor comprising:
    a motor housing;
    a stator; and
    a vibrator and at least two sets of elastic support assemblies which suspend the vibrator in the motor housing and are used for supporting the vibrator and providing elastic restoring forces, wherein:
    the elastic support assemblies are located between an inner wall of the motor housing and the vibrator; each set of the elastic support assemblies comprises at least two elastic supports,
    the elastic support comprises a first connection point fixedly connected to the vibrator and a second connection point fixedly connected to the inner wall of the motor housing, and the second connection point is coupled onto a side wall, parallel to a vibration direction of the vibrator, of the motor housing,
    both the first connection point and the second connection point of the elastic support are located on the same side of a central axis of the vibrator, and the central axis of the vibrator is parallel to the vibration direction of the vibrator; and
    a make-way portion is arranged at an intersection position of the two elastic supports.

2. The linear vibration motor according to claim 1, wherein the elastic support comprises a first elastic arm formed by extending the first connection point and a second elastic arm formed by extending the second connection point, and tail ends of the first elastic arm and the second elastic arm are connected.

3. The linear vibration motor according to claim 2, wherein:
    the first elastic arm and the second elastic arm are located on the same side of the first connection point and the second connection point, and
    the first elastic arm is formed by extending the first connection point to a side, away from the first connection point, of the vibrator, and the second elastic arm is formed by extending the second connection point along a side wall, parallel to the vibration direction of the vibrator, of the motor housing, and the side, away from the first connection point, of the vibrator successively.

4. The linear vibration motor according to claim 2, wherein the tail ends of the first elastic arm and the second elastic arm are fixed by welding.

5. The linear vibration motor according to claim 1, wherein the elastic supports are elastic sheets or springs.

6. The linear vibration motor according to claim 5, wherein the material width of the elastic sheet is greater than the thickness of the elastic sheet.

7. The linear vibration motor according to claim 5, wherein the elastic sheet comprises two metal material layers located on a surface and a damping material layer coupled between the two metal material layers.

8. The linear vibration motor according to claim 1, wherein a damping element is arranged inside an elastic gap in the elastic support assembly, respectively.

9. The linear vibration motor according to claim 1, wherein:
the vibrator comprises at least two adjacent permanent magnets and a magnetic conduction yoke arranged between the adjacent permanent magnets, and adjacent ends of the two adjacent permanent magnets have the same polarity,
the stator comprises coils and magnetic conduction cores arranged in the coils, and
a magnetization direction of the permanent magnet is perpendicular to an axis of the coil.

10. The linear vibration motor according to claim 9, wherein:
the magnetic conduction yoke and the magnetic conduction core are staggered, and
a horizontal distance d between the magnetic conduction yoke and the magnetic conduction core corresponding to the magnetic conduction yoke is within a numerical range of 0.1 mm to 0.3 mm.

11. A linear vibration motor comprising:
a motor housing;
a stator; and
a vibrator and at least two sets of elastic support assemblies which suspend the vibrator in the motor housing and are used for supporting the vibrator and providing elastic restoring forces, wherein:
the elastic support assemblies are located between an inner wall of the motor housing and the vibrator;
each set of the elastic support assemblies comprises at least two elastic supports,
the elastic support comprises a first connection point fixedly connected to the vibrator and a second connection point fixedly connected to the inner wall of the motor housing, and the second connection point is coupled onto a side wall, parallel to a vibration direction of the vibrator, of the motor housing,
both the first connection point and the second connection point of the elastic support are located on the same side of a central axis of the vibrator, and the central axis of the vibrator is parallel to the vibration direction of the vibrator,
the elastic supports are elastic sheets or springs, and
the elastic sheet comprises two metal material layers located on a surface and a damping material layer coupled between the two metal material layers.

* * * * *